US008229287B1

(12) United States Patent
Duggal et al.

(10) Patent No.: US 8,229,287 B1
(45) Date of Patent: Jul. 24, 2012

(54) MULTI-MODAL METHOD FOR DYNAMICALLY ABRIDGING AND EXPANDING MEDIA CONTENT

(75) Inventors: Ashish Duggal, Delhi (IN); Anant Gilra, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 400 days.

(21) Appl. No.: 12/550,915

(22) Filed: Aug. 31, 2009

(51) Int. Cl.
*H04N 5/783* (2006.01)
(52) U.S. Cl. ........................................ 386/344; 386/343
(58) Field of Classification Search .................. 386/278, 386/281, 343, 344, 350, 341
See application file for complete search history.

(56) References Cited

U.S. PATENT DOCUMENTS

| 5,377,051 A | * | 12/1994 | Lane et al. ..................... 386/314 |
| 6,868,440 B1 | | 3/2005 | Gupta et al. |
| 6,963,378 B2 | | 11/2005 | Li et al. |

* cited by examiner

*Primary Examiner* — Robert Chevalier
(74) *Attorney, Agent, or Firm* — Robert C. Kowert; Meyertons, Hood, Kivlin, Kowert & Goetzel, P.C.

(57) ABSTRACT

Systems and methods are presented for viewing video content while dynamically switching between multiple viewing modes that present the video content at different levels of abridgment. While video content is playing in one viewing mode, input may be received to play the video content in another viewing mode. One of the viewing modes may present the video content in a more condensed form than the other viewing mode does, so that when switching from one viewing mode to another viewing mode, a more abridged or less abridged version of the video content may be presented. One of the viewing modes may be a full presentation mode that shows a complete, unabridged version of the video content, while the other of the viewing modes may play a condensed version of the video content.

20 Claims, 8 Drawing Sheets

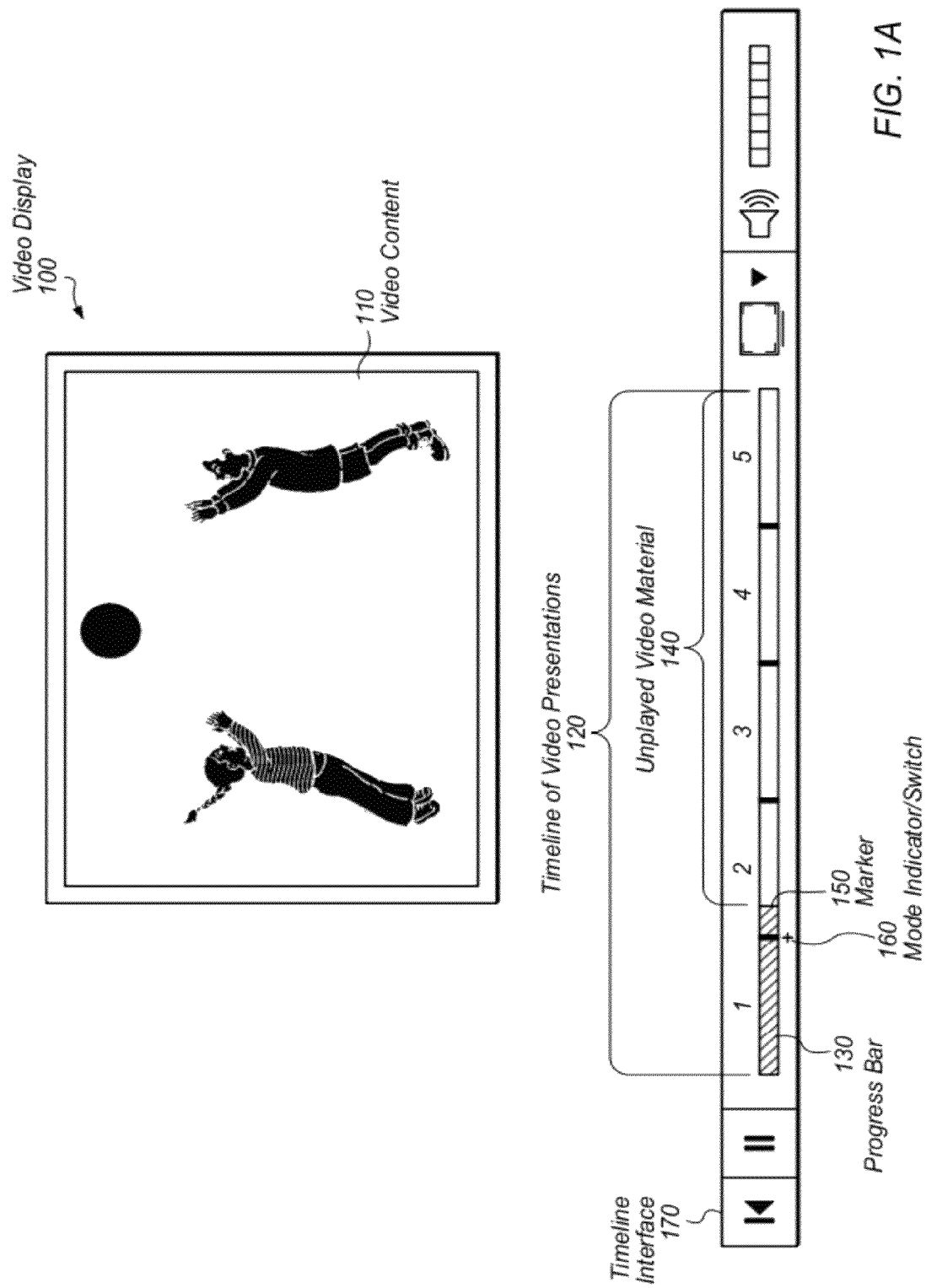

MULTI-MODAL METHOD FOR DYNAMICALLY ABRIDGING AND EXPANDING MEDIA CONTENT

BACKGROUND

Today people can watch all kinds of video productions like movies, television serials, sports series, lecture series, news programming, and the like on computers, mobile devices, video consoles, televisions, or other viewing apparatus. It is no longer necessary to view video content according to a fixed schedule set by a broadcaster or theater or other agency. Now viewers can choose where and when they want to see media productions.

The supply of video content is so vast that surveying the available stock and choosing what to watch can be an arduous task. Looking through a series of episodes to locate a remembered scene may be similarly burdensome. If one wants to survey even a single television series, looking for a remembered theme, or for some particularly interesting part, one may be forced to scan through a whole sequence of episodes or of synopses of those episodes in a tedious, linear fashion.

SUMMARY

Various embodiments of systems and methods for receiving input to play video content in an abridging mode are disclosed, where the abridging mode presents an abridged version of the video content. In response to receiving input to play video content in an abridging mode, the video content is played in the abridging mode. While playing the video content in the abridging mode, and in response to receiving input to switch from the abridging mode to an expanding mode, playing of the video content switches from the abridging mode to the expanding mode. The expanding mode presents a longer and more detailed version of the video content than the abridging mode does.

While video content is being played in the expanding mode, input may be received to switch to the abridging mode, so that playing of the video content switches from the expanding to the abridging mode. In some embodiments, there may be more than two modes for playing video content, where for each pair of the playing modes, one of the pair presents a more abbreviated version of the video content than the other of the pair of modes does. Given such a pair of playing modes A and B, then in response to receiving input to switch from playing mode A to playing mode B, and based upon a location within the video content currently playing in mode A, a corresponding portion of the video content to be played in mode B is determined. Some embodiments may include a full presentation mode that presents a full, unabridged, complete version of the video content. According to various embodiments, indicators may show which mode is the current playing mode. For some embodiments, the video content being played may include several video presentations, and a signal may indicate when playing transitions from one of the several video presentations to another of the video presentations.

Some embodiments may also provide a timeline interface that displays a representation of video presentations scheduled for playing. Such a timeline interface may expand or contract portions of the representation of the video presentations in response to a change from one playing mode to another. For example, if a portion of the content that is playing in one mode will take less time to play in another mode, then its timeline representation may contract when playing switches to the other mode. Conversely, its timeline representation may expand if more time is needed to play the portion of content in the other mode. Representations of other portions of the video presentations may correspondingly be adjusted by expanding or contracting.

In certain embodiments, a memory is coupled to a processor, and the memory stores program instructions executable by the processor to implement a video playing module. In these embodiments, the functions described above may be performed by the video playing module. In some embodiments, the system may include a computer-readable storage medium storing program instructions that are computer-executable to perform these functions.

BRIEF DESCRIPTION OF THE DRAWINGS

FIG. 1A illustrates one embodiment of a timeline interface representing multiple video presentations, where video content is playing in an abridging mode.

Figure 1B:
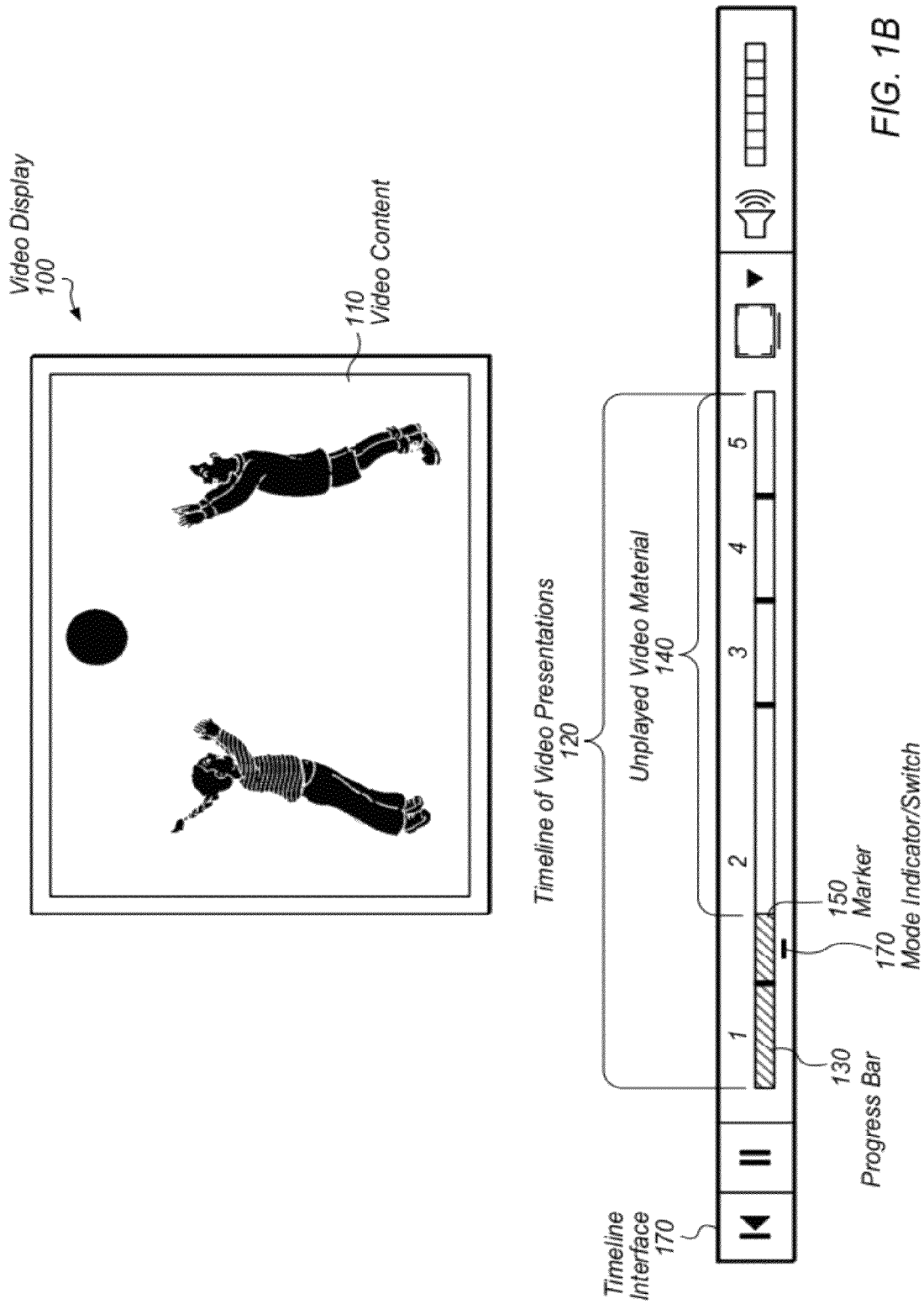
FIG. 1B illustrates one embodiment of a timeline interface representing multiple video presentations, where video content is playing in an expanding mode.

While the present disclosure is described herein by way of example for several embodiments and illustrative drawings, those skilled in the art will recognize that the disclosure is not limited to the embodiments or drawings described. It should be understood, that the drawings and detailed description thereto are not intended to limit the claims to the particular form disclosed, but on the contrary, the intention is to cover modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

As noted above, sifting through a series of video episodes, or even one long video production in order to locate compelling or sought-after portions can be a burdensome activity. Relief from such monotonous linear processing of large amounts of video material may be found in an approach that allows one to dynamically shift back and forth between viewing abridged segments and viewing more expanded, fuller segments of related media material. Just as it is helpful to leaf through a book by switching between reading multi-chapter section descriptions, chapter descriptions, and portions of actual text within a chapter, so can it be very useful to traverse a large video offering by freely moving at will, back and forth between synopsis and detail. One would wish, when looking through a series of synopses of episodes, to be able to "drill down" and immediately switch to watching a more detailed version of a part found while scanning a synopsis, and, if the more detailed version appears promising, to switch to an even more complete corresponding version. One would also want to be able, just as readily, to escape from viewing a relatively complete version of an episode, and to return to a more synoptic mode. A capacity for alternating back and forth between more synoptic and more extensive viewing levels for substantial quantities of viewing matter would be most advantageous.

In the following discussion, various embodiments of systems and methods for dynamically switching between viewing an abridgement and viewing a relatively fuller presentation of video material are explored. There are detailed descriptions of modes which present video material in varying degrees of completeness, from abridging modes giving that give compact synopses, to expanding modes that offer longer versions of the same material, or even a full, complete version of the material. There is a discussion of switching from one mode to another while watching the video content. A timeline interface offering a representation of an assembly of several video presentations is explained in detail. Throughout the discussion, the terms "viewing mode" and "playing mode" are used interchangeably.

Dynamically Abridging and Expanding Video Content while it Plays

In FIG. 1A, video display 100 is shown with an abridged version of video content 110 playing upon it. The playing of video content 110 on video display 100 may be monitored or controlled on a timeline interface such as the illustrated sample timeline interface 170 shown beneath video display 100. The appearance and functioning of timeline interface 170 may vary according to the embodiments. In certain embodiments, timeline interface 170 may appear on video display 100 itself, or in some other location. Timeline interface 170 may, in some instances, be implemented so that it appears on a video output device, such as a video device that includes video display 100. Alternatively, a video device hosting timeline interface 170 may not be the same video device that includes video display 100. Timeline interface 170 may, according to some embodiments, be implemented on a separate hardware device such as a remote control, where portions of timeline interface 170 are permanently represented on the hardware device, even when the device is turned off. For example, symbols indicating pause, play, zoom, seek, audio amplification, or some other function may be etched into the device itself, while other components of timeline interface 170 may be designed to operate only when the device is turned on. Timeline interface 170 may, according to some embodiments, be partially or completely invisible during some of the time video content 110 is playing. For example, in some implementations, timeline interface 170 may be configured to be summoned or dismissed at various points during the time video content 110 is playing.

Various components of timeline interface 170 shown in FIG. 1A may exist separately, or they may be implemented in combination, according to distinct embodiments. The particular structure and functioning depicted in timeline interface 170 provides but one example of an architecture for timeline interface 170. Other designs for timeline interface 170 may be constructed according to particular requirements of various other embodiments, and may include some of the elements present in FIG. 1A, but exclude other of those elements, while incorporating elements not included in the embodiment shown in FIG. 1A.

Timeline interface 170 may, according to many embodiments, be a dynamic mechanism that is actively responsive to the playing of video content, providing various indications to a user regarding the playing of viewable content. It may also provide means for a user to control the playing of video material. These operational aspects of timeline interface 170 are explained below.

It is contemplated that, in some embodiments, a multi-modal method for dynamically abridging and expanding video content while it is playing may be implemented without resorting to a timeline interface, and that a different interface or control mechanism may be implemented to allow a person watching video content to freely switch between viewing modes "on the fly" while the video content is playing.

The example timeline interface 170 is depicted in FIG. 1A as having a timeline bar 120 that provides a representation of several video presentations. For example, in the illustrated embodiment, timeline bar 120 has five contiguous segments, each one representing a video presentation scheduled for playing. According to embodiments, the several video presentations represented on timeline bar 120 may be automatically played in a given sequential order. In some implementations, the video presentations scheduled for playing may play completely through in a given order until all of the video presentations have been played, without ever changing viewing modes. In such embodiments, switching from one viewing mode to another viewing mode may require additional input. Additional input to switch from one viewing mode to another may be provided a human user, in some instances. In other instances, input to switch viewing modes may be generated programmatically, without requiring user action. In certain cases, input to switch viewing modes may be embedded within video presentations themselves, or within configuration files governing the playing of the video presentations.

Timeline bar 120 may represent any number of video representations, according to embodiments. The five segments of timeline bar 120 are labeled in FIG. 1A using the numerals 1 through 5, but such labeling is optional. In other instances, segments or other components of timeline interface 170 representing video presentations may not be labeled, or may be identified in some other manner. Similarly, the four graduations shown on timeline bar 120 to mark boundaries between video presentation representations may or may not be implemented as visible markers, depending on the requirements of the embodiments. Representation of video presentations on timeline bar 120 may be dynamic. For example, modal changes for playing the video presentations may require substituting one mode-based version of a video representation for another mode-based version of the video representation; if the two versions have different lengths, then timeline bar 120 may adjust itself to reflect the different lengths, and it may make other adjustments to reflect a change in the playing status of the video presentations.

Progress bar 130 may indicate video material that has already been played. For example, in the embodiment shown in FIG. 1A, progress bar 130 shades the first segment and part of the second segment of timeline bar 120, indicating that the video presentation represented by the first segment has already played, and that a part of the video presentation represented by the second segment has already played. Area 140 of timeline bar 120, which is the portion of timeline bar 120 not indicated by progress bar 130, may denote video content which is scheduled for playing, but which has not yet been played. As playing of the video presentations progresses, progress bar 130 may lengthen to indicate the growing proportion of material that has already played, while area 140 correspondingly may shrink, to indicate the diminishing proportion of video content which has not yet been played. Marker 150 may indicate the current location within the currently-playing video presentation.

Indicator 160 may serve a variety of purposes, and it may serve several purposes simultaneously, according to various embodiments. In the particular embodiment illustrated in FIG. 1A, indicator 160 may serve at least four distinct purposes, as described in the following paragraphs.

First, the location of indicator 160 may mark the beginning of a currently-playing video presentation represented on timeline bar 120. FIG. 1A shows the second of the video presentations as the one currently-playing. In some embodiments, a different marker for the beginning of a video segment may be implemented, and element 160 may not appear at the beginning of a video segment. For example the division between the end of the first presentation and the beginning of the second presentation may also be indicated by a vertical graduation, like the one shown inside progress bar 130 above indicator 160. According to other embodiments, the beginning of a currently-playing video segment may not be indicated with a special-purpose marker.

Second, indicator 160 may serve as a mode symbol, signifying that the currently-playing video presentation, in this instance the second of the five video presentations represented on timeline bar 120, is being played in the abridging mode. In the particular implementation illustrated in FIG. 1A, indicator 160 signals that the second of the five video presentations represented on timeline bar 120 is being played in the abridging mode by appearing as a plus sign. To indicate playing in the expanding mode, indicator 160 may appear as a minus sign, as shown in FIG. 1B. Indicator 160 may also appear alternately as either a dark or a light disc, as in the embodiment illustrated in FIG. 1C, to signal switching between viewing modes. Indicator 160 may also function together with other indicators when a multiplicity of viewing modes is available. For example, in the embodiment illustrated in FIG. 1C, element 160 and element 165 operate jointly to indicate operation in three different viewing modes. Such operation is discussed below in the description of FIG. 1C. According to some embodiments, an indication of a viewing mode for currently-playing video material may be provided by other means.

Third, indicator 160 may function as an interactive interface element for timeline interface 170 for switching between viewing modes. In the particular embodiment illustrated in FIG. 1A, a user may click on indicator 160 while it appears as a plus sign in order to switch from an abridging viewing mode to an expanding viewing mode. When a user clicks on the plus sign shown in FIG. 1A, the currently-playing video presentation will switch from playing in an abridging mode to playing in an expanding mode, and indicator 160 will change into a minus sign, as shown in FIG. 1B. The minus sign of FIG. 1B signifies that the currently-playing video presentation is playing in an expanding mode. Should the user click on the minus sign form of element 160 shown in FIG. 1B, then the currently-playing video presentation will switch from playing in an expanding mode to playing in an abridging mode, and element 160 will change back into a plus sign, as shown in FIG. 1A. Other structures for switching among a multiplicity of viewing modes may be implemented in some embodiments. For example, in the embodiment illustrated in FIG. 1C, there are two distinct elements 160 and 165 which operate jointly to allow operating in any of three different viewing modes, as discussed below. Element 160 may not be interactive in some embodiments, and input for switching among modes may be facilitated in some other manner. For example, in some embodiments, a user may press a combination of keys on a keyboard, or press a button on a hardware device, to switch from one viewing mode to another.

Fourth, indicator 160 may signal a transition from one video presentation to another video presentation. For example, although it is not shown in FIGS. 1A and 1B, element 160 may appear in one of two alternating colors, changing from one color to the other color as playing progresses from one presentation to the next. In the embodiment illustrated in FIG. 1C, a short horizontal bar toggles between two positions at indicator 160 to indicate passage from one video episode to another, and a short vertical bar toggles left and right at indicator 165 whenever there is a transition from one subdivision of an episode to another subdivision of an episode. Alternatively, for the embodiment illustrated in FIG. 1C, four different colors may be used to indicate such transitions, where indicator 160 alternates between two of the four colors, and indicator 165 alternates between the other two of the four colors.

It is not necessary that all four purposes be managed with a single element. In other embodiments, the four purposes may be separately served using separate elements.

Figure 1C:
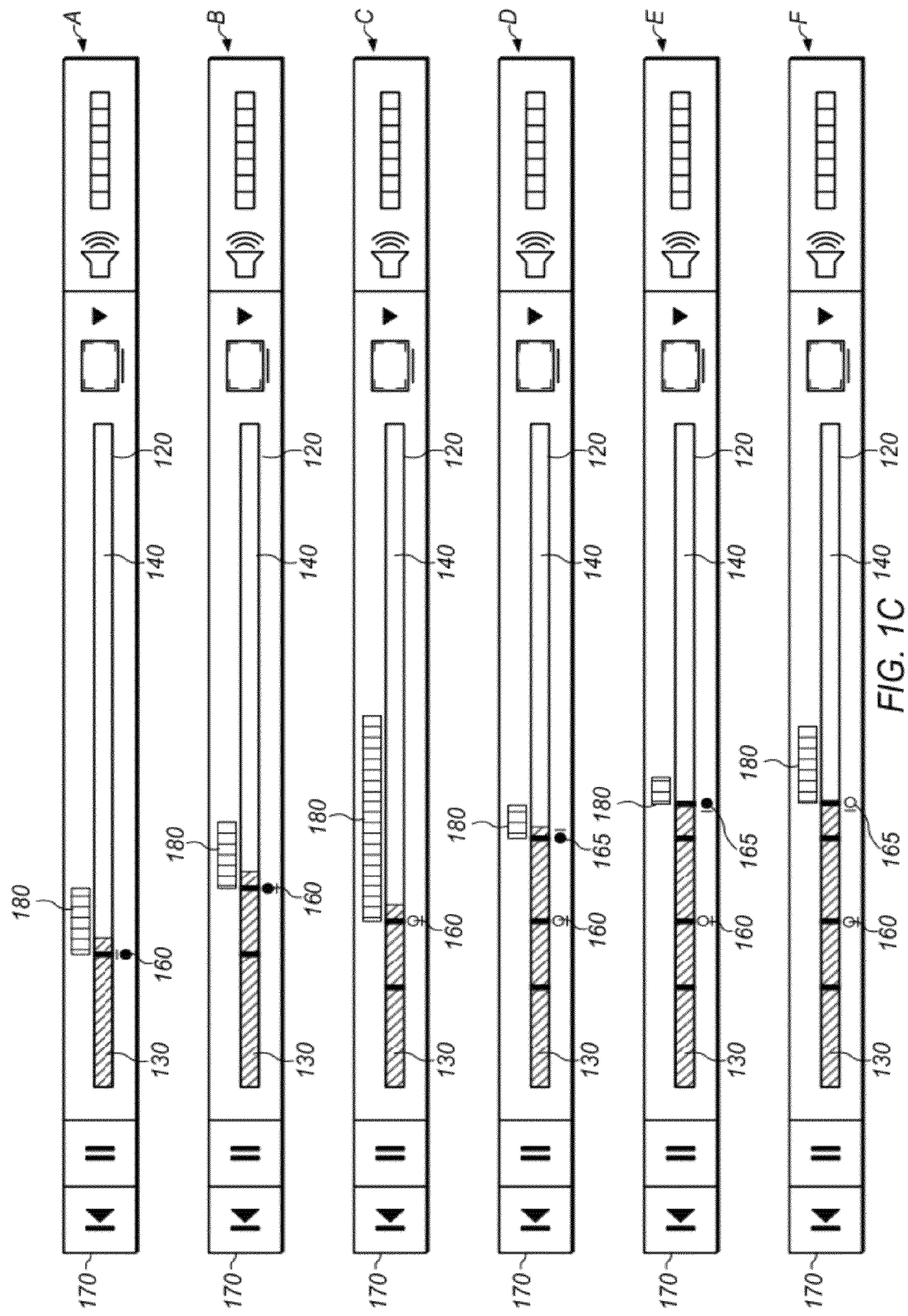
FIG. 1C illustrates one embodiment of a timeline interface for playing video material in three different viewing modes.

FIG. 1C illustrates one embodiment of a timeline interface for playing video material in three different viewing modes. In this particular embodiment, the three different modes are called the abridging mode, the expanding mode, and the full presentation mode. In other embodiments implementing three different viewing modes, a full presentation mode may not necessarily be included. For example, the three different modes may be so constructed that, given any pair of the modes, one of the pair presents a more abbreviated version of video content than the other of the pair does, but none of the three different modes presents a complete version of the video content. In yet other embodiments, more than three different viewing modes may be implemented. According to some embodiments, only two different viewing modes may be implemented.

The abridging mode illustrated in FIG. 1C presents an abridged version of video content. The expanding mode presents a longer and more detailed version of the video content than the abridging mode does, but the expanding mode still does not present a full, complete, unabridged version of the video content. The full presentation mode shows a full, complete, unabridged version of the video content. Thus, the three modes illustrated in FIG. 1C offer three different levels of granularity, with the abridging mode giving the most abridged version of the video content, the expanding mode giving a fuller, but not complete version of the video content, and the full presentation mode giving the full, complete, unabridged version of the video content.

FIG. 1C illustrates a sequence of snapshots for an example embodiment of timeline interface 170. The six snapshots are labeled A, B, C, D, E, and F, each taken at a later time than its predecessor. Video Display 100 and the currently-playing version of video content 110 are not shown in FIG. 1C. Timeline bar 120 represents a plurality of video presentations scheduled for playing. Progress bar 130 may indicate video material that has already been played. Area 140 of timeline bar 120, which is the portion of timeline bar 120 not indicated by progress bar 130, may denote the video content which is scheduled for playing, but has not yet been played.

In snapshot A, the location of indicator 160 may mark the beginning of a second episode of the video presentations represented on timeline bar 120. The division between the end of the first episode and the beginning of the second episode may be further indicated by the vertical graduation shown inside progress bar 130 above indicator 160. In this example embodiment, indicator 160 of snapshot A may also denote that the currently-playing episode, in this instance the second episode, is being played in the abridging mode. Length bar 180 may represent the length of the currently-playing episode, which is the second episode, while it is playing in the abridging mode. Note that progress bar 130 overlaps length bar 180, and that the overlap indicates the portion of the currently-playing episode that has already been played.

In snapshot B, taken at a later time than snapshot A, indicator 160 may mark the beginning of a third episode of the video presentations represented on timeline bar 120. The division between the end of the second episode and the beginning of the third episode may be further indicated by a second vertical graduation shown inside progress bar 130. Indicator 160 of snapshot B may also denote that the currently-playing episode, the third episode, is being played in the abridging mode. Length bar 180 may represent the length of the currently-playing episode, which is the third episode, while it is playing in the abridging mode. Note that progress bar 130 overlaps length bar 180, and that the overlap indicates the portion of the currently-playing third episode that has already played.

In snapshot A, there is a short horizontal bar above indicator 160, and in snapshot B, there is a short horizontal bar below indicator 160. The horizontal bar is designed to toggle between the two positions whenever there is a transition from one episode to another, or from one subdivision of an episode to another subdivision of an episode. It is not necessary that the transition be indicated by a horizontal bar. Other means for indicating transitions may be implemented for other embodiments. For example, a change in color may be used to signal a transition from one episode to another, or from one subdivision of an episode to another subdivision of an episode.

In the embodiment illustrated in FIG. 1C, input to switch between the abridging mode and the expanding mode may be generated by clicking on indicator 160. Snapshot C depicts timeline interface 170 after someone has clicked indicator 160 of snapshot B. In snapshot C, indicator 160 has changed form, from the black disc shown in snapshot B to the white disc shown in snapshot C. This change may indicate that the currently-playing episode, which is the third episode, is now being shown on video display 100 in the expanding mode rather than in the abridging mode. The location of indicator 160 may also mark the beginning of the third episode of the video presentations represented on timeline bar 120. Notice that length bar 180 is longer in snapshot C than it is in snapshot B: in snapshot C, length bar 180 represents the length of the currently-playing episode, which is the third episode, while playing in the expanding mode. Because the expanding-mode version of the third episode is longer than the abridging-mode version of the third episode, length bar 180 is correspondingly longer in snapshot C than it is in snapshot B.

The short horizontal bar underneath indicator 160 in snapshot B remains underneath indicator 160 in snapshot C because there is no transition of episodes; in both snapshots, the third episode is the currently-playing episode. The portions of timeline bar 120 that do not represent the third episode may shorten in moving from snapshot B to snapshot C in order to accommodate the longer, expanding-mode version of the third episode.

In snapshot D, an indicator 165 appears to the right of indicator 160. In this instance, second indicator 165 may mark the beginning of the currently-playing subdivision of the currently-playing episode, namely the second subdivision of the third episode. In the embodiment illustrated in FIG. 1C, the expanding-mode version of an episode may contain several subdivisions. Notice that the portion of timeline bar 120 that lies between indicators 160 and 165, i.e., between the two graduations shown inside progress bar 130 above indicators 160 and 165, is a representation of the first subdivision of the third episode, which has already played, as may be indicated by progress bar 130. In this example embodiment, indicator 165 of snapshot D may also denote that the currently-playing subdivision of the currently-playing episode, the second subdivision of the third episode, is being played in the same mode as indicated by indicator 160, namely the expanding mode. Length bar 180 may shorten in moving from snapshot C to snapshot D because, in snapshot D, length bar 180 may represent the length of the currently-playing subdivision of the currently-playing episode, rather than the length of the currently-playing episode, as it does in snapshot C. The presence of indicator 165 may signal to the person watching video display 100 that a particular subdivision of the currently-playing episode is being played, and length bar 180 may correspondingly shorten so that it represents only the length of the currently-playing subdivision of the currently-playing episode, as in snapshot D, rather than the length of the entire currently-playing episode. In snapshot D, the currently-playing subdivision is the second subdivision of the third episode. Element 160 of snapshot D indicates that the third episode continues playing in the expanding mode, while element 165 signals that the second subdivision of the third episode remains playing in the expanding mode. Element 165 offers the user the opportunity to switch from viewing a subdivision of the third episode in the expanding mode to viewing the subdivision in the full presentation mode.

In snapshot E, indicator 165 may mark the beginning of the currently-playing subdivision of the currently-playing episode, namely the third subdivision of the third episode. The portion of timeline bar 120 that lies between indicators 160 and 165, i.e., between the two graduations shown inside progress bar 130 above indicators 160 and 165, is a representation of the first and second subdivisions of the third episode, which have already played, as may be indicated by progress bar 130. Indicator 165 may also denote that the currently-playing subdivision of the currently-playing episode, the third subdivision of the third episode, is being played in the same mode as indicated by element 160, namely the expanding mode. Length bar 180 may represent the length of the currently-playing subdivision of the currently-playing episode, namely the third subdivision of the third episode, while it is playing in the expanding mode. Note that progress bar 130 and length bar 180 do not overlap in snapshot E, indicating that the third subdivision of the third episode is just beginning to play.

In snapshot D, there is a short vertical bar right of indicator 165, and in snapshot E, there is a short vertical bar left of indicator 165. The vertical bar is designed to toggle between the two positions whenever there is a transition from one subdivision of an episode to another subdivision of an episode. It is not necessary that the transition be indicated by a vertical bar. Other means for indicating transitions may be implemented for other embodiments. For example, a change in color may be used to signal a transition from one subdivision of an episode to another subdivision of an episode.

In the embodiment illustrated in FIG. 1C, input to switch between the expanding mode and the full presentation mode may be generated by clicking on indicator 165. Snapshot F depicts timeline interface 170 after someone has clicked indicator 165 of snapshot E. In snapshot F, indicator 165 has changed form from the black disc shown in snapshot E to the white disc shown in snapshot F. This change may indicate that the currently-playing subdivision of the currently-playing episode, namely the third subdivision of the third episode, is now being shown on video display 100 in a viewing mode that is more detailed than the viewing mode indicated by element 160, that is, in the full presentation mode rather than in the expanding mode. In snapshot F, the location of indicator 165 may also mark the beginning of the currently-playing subdivision of the currently-playing episode, namely the third subdivision of the third episode of the video presentations represented on timeline bar 120. The portion of timeline bar 120 that lies between indicators 160 and 165, i.e., between the two graduations shown inside progress bar 130 above indicators 160 and 165, is a representation of the first and second subdivisions of the third episode, which have already played, as may be indicated by progress bar 130. Notice that length bar 180 is longer in snapshot F than it is in snapshot E: in snapshot F, length bar 180 represents the length of the currently-playing subdivision of the currently-playing episode, namely the third subdivision of the third episode, when playing in full presentation mode. Because the full-presentation-mode version of the third subdivision of the third episode is longer than the expanding-mode version of the third subdivision of the third episode, length bar 180 is correspondingly longer in snapshot F than it is in snapshot E. Note that progress bar 130 and length bar 180 do not overlap in snapshot F, indicating that the third subdivision of the third episode is just beginning to play; in this instance, the playing is in the full presentation mode. Snapshot F shows an instance in which a user has "drilled down" two levels while viewing video material. First, the user chose to switch from watching the abridging-mode version of the third episode to watching the expanding-mode version of the third episode [snapshot B->snapshot C]. Then, while watching the third subdivision of the third episode in the expanding mode [snapshot E], the user chose to switch to the full presentation mode [snapshot F].

The short vertical bar left of indicator 165 in snapshot E remains left of indicator 165 in snapshot F because there is no transition of subdivisions; in both snapshots, the third subdivision of the third episode is the currently-playing subdivision of the currently-playing episode. The portions of timeline bar 120 that do not represent the third subdivision of the third episode may shorten in moving from snapshot E to snapshot F in order to accommodate the full-presentation-mode version of the third subdivision of the third episode.

It is not necessary that the indication of a location on timeline bar 120 and the indication of a playing mode be incorporated within a single symbol like indicator 160 or 165. In some embodiments, there may be separate indications given to denote a location on timeline bar 120, and to denote a playing mode. Neither is it necessary that indicator 160 or 165 take the form of a disc. In other embodiments, indicator 160 or 165 may be implemented in different forms. It is not necessary that input to switch between viewing modes be generated by clicking on indicator 160 or 165. According to other embodiments, input to switch between viewing modes may be generated by other means. For example, mode changes may be signaled by pressing a key on a keyboard, or by any number of other conventional means for generating a signal, according to numerous embodiments. Timeline bar 120, progress bar 130, and length bar 180 may also take a variety of forms other than the ones shown in FIG. 1C, according to various embodiments. Furthermore, in the embodiment illustrated in FIG. 1C, the vertical graduations shown inside progress bar 130 serve explanatory purposes, and may not necessarily appear in actual implementations. According to various embodiments, progress bar 130 or length bar 180 may not appear as visible indicators.

Figure 2:
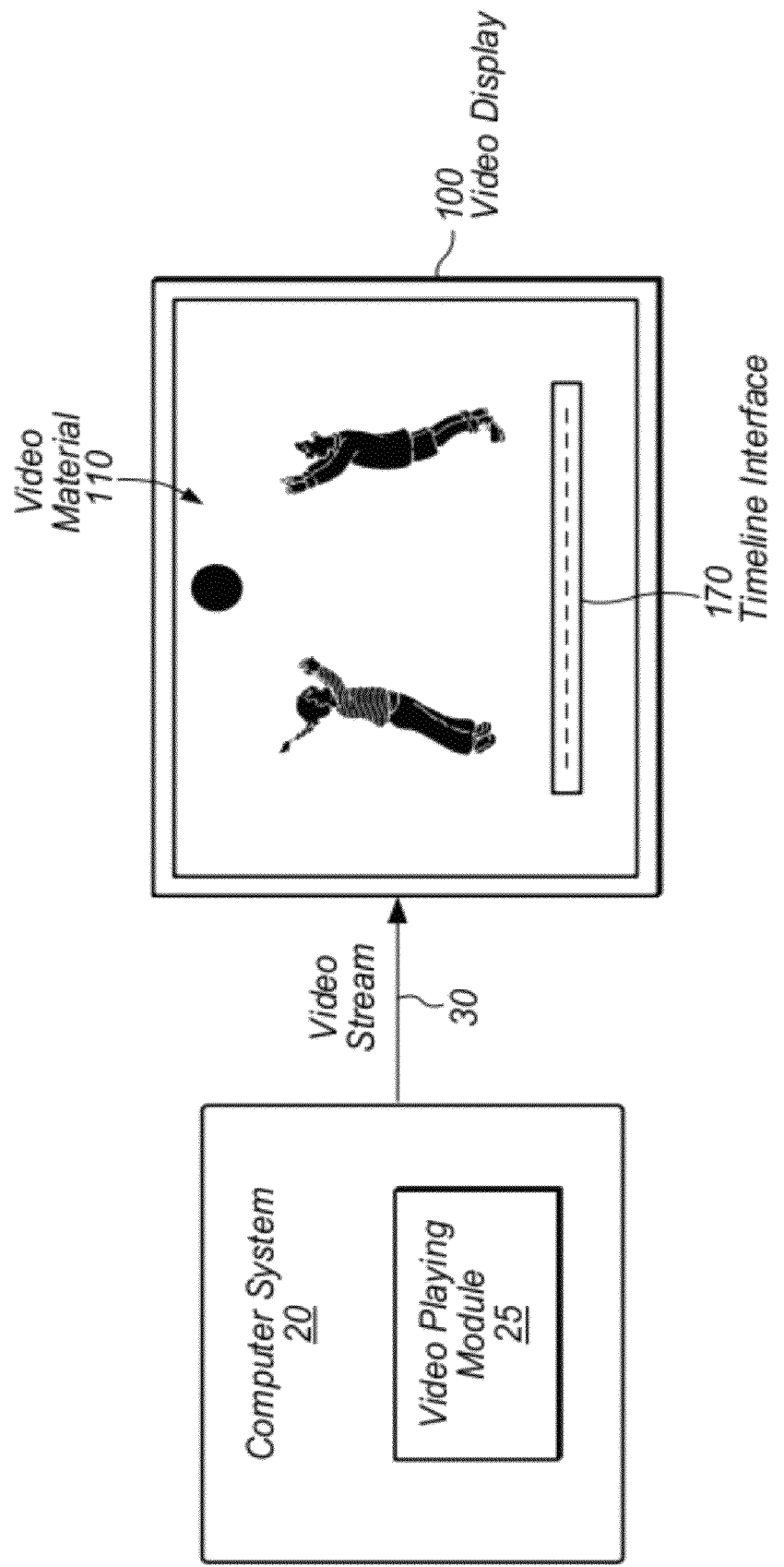
FIG. 2 illustrates one embodiment of an architecture that may be configured to implement various features of the systems illustrated in FIGS. 1A-1C.

FIG. 2 illustrates one embodiment of an architecture that may be configured to implement any or all of the various features of the systems illustrated in FIGS. 1A-1C. In the embodiment illustrated in FIG. 2, video playing module 25 is configured to provide a multi-modal method for dynamically abridging and expanding video content using various playing modes while video playing module 25 plays the video content on video display 100. It is noted that across a range of embodiments, functions of video playing module 25 may be implemented in hardware, in software, or in a combination of software and hardware.

Generally speaking, computer system 20 may correspond to any suitable type of computer system configured to execute applications. For example, computer system 20 may correspond to a desktop computer system, a laptop or notebook or netbook computer, a mainframe computer system, a workstation, a network computer, a handheld computing device such as a personal digital assistant, cellular phone, media player, or combination device, a camera, a set top box, a mobile device, a consumer device, a video game console, a handheld video game device, an application server, a storage device, a peripheral device such as a switch, modem, or router, or another type of computing or electronic device. In various embodiments, computer system 20 may include a microprocessing system, storage capacity, input and output systems, and/or networking capability. Storage capacity may be implemented remotely or locally, and may include internal storage or removable media devices. Internal storage may be implemented, for example, using memory, such as random access memory (RAM), mass storage devices such as hard disks, solid-state drives, disk array controllers, or other suitable means. Removable storage media devices may include, for example, compact disc systems, DVD systems, Blu-ray systems, floppy disk drives, Zip drives, USB flash drives, tape drives, or other types of devices. Input systems may include a keyboard, mouse, trackball, joystick, touchpad, touch screen, graphics table stylus, pointing stick, light pen, directional pad, eye tracking device, gesture signaling device, or similar input device, and may also include an image scanner or web cam for image or video input. Output systems may variously include a video subsystem including a video monitor or other display device, an audio subsystem, or other types of output devices. In some embodiments, computer system 20 may be configured to execute one or more operating systems, such as Microsoft Windows™, Apple MacOS™, Linux™, or any other suitable operating systems.

It is contemplated that according to various embodiments, features of video playing module 25 may be implemented, in whole or in part, as a software component of an application or library or operating system or device driver, and that such a software component may exist within, or partially within computer system 20 and peripheral devices such as video display 100 or a remote control device (not shown). For example, in some cases, functions for dynamically abridging and expanding video content while the video content is playing may be fully encoded within a dedicated software application designed to play video content. In other cases, an application programming interface (API) for a software library may incorporate elements that facilitate dynamically abridging and expanding video content while the video content is playing. A software library, or an operating system module, may supply capability for dynamically abridging and expanding video content while the video content is playing, either to a software embodiment or to a hardware embodiment of a component of video playing module 25. In some instances, functions provided by video playing module 25 may be included in a software driver for a remote control device or for another device involved in playing video content.

It is further contemplated that features of video playing module 25 for dynamically abridging and expanding video content may be implemented, in some embodiments, in whole or in part, as a hardware component of a device such as a remote control device (not shown), display 100, computer system 20, or other device involved in playing video content. In some embodiments, an operating system may enable, in compatible hardware used for playing video material 110, capabilities for dynamically abridging and expanding video content while the video content is being played.

According to various embodiments, video playing module 25 may be configured to play a variety of video material 110. Video material 110 may include video recordings comprising diverse categories, such as movies, serial productions like television serials, sports series, and lecture series, video archives which may be arranged using various classifying schemes, single and multiple long video exposures such as may be produced by a recording telescope or surveillance recorder or other observational apparatus for capturing video data, and other kinds of playable video data.

Video material 110 may be stored on virtually any kind of medium for storing recorded video material, including photochemical media like photographic film, magnetic media like magnetic tape, floppy disks, and hard disks, optical media like optical discs and optical tape, solid state semiconductor memory, and any other medium that can store video material. Video material 110 may be stored either locally or remotely. Video playing module 25 may directly access video material 110 stored on a local device, or it may access video material 110 through a network connection to a local or a remote device storing video material 110.

Visual output generated by playing video material 110 may be displayed on a variety of devices, including, but not limited to televisions, computers, video recording devices, video playing devices, media players, video consoles, mobile video devices, cameras, and other appliances having video display capabilities.

Video playing module 25 may be configured to perform several functions in the service of dynamically abridging and expanding video content while the video content is playing. Video playing module 25 may be configured to receive input to play video content in any of several different modes for playing video content. For example, as illustrated in FIGS. 1A-1C, video playing module 25 may furnish a timeline interface 170 that includes a clickable control element 160 used to signal video playing module 25 that it should switch from one playing mode to another playing mode. In other embodiments, other types of interface control elements may be deployed for signaling video playing module 25 that video material 110 should be switched to a particular playing mode. In certain embodiments, a keystroke or combination of keystrokes may be used to signal switches from one playing mode to another. According to numerous embodiments, virtually any conventional method of input may be used to notify video playing mode 25 to switch from one playing mode to another.

Input to invoke a particular playing mode may be provided manually by a human user, or may be generated automatically according to preset criteria. For example, cues recognizable by video playing module 25 may be embedded in video material 110 to trigger automatic switches from one playing mode to another. For another example, a configuration file that governs the manner in which video material 110 is played may inform video playing module 25 that it ought to switch from playing video material 110 in one mode to playing video material 110 in a different mode.

In still other embodiments, a program may be implemented to automate switches in playing mode based upon certain criteria. For example, a program may be generated to initiate automatic switches between playing modes for playable video data captured by an observational apparatus like a recording telescope. In some such instances, criteria determining playing mode switches may be tied to characteristics or attributes of the content of the captured playable video data. For instance, a significant change in brightness or shape or velocity represented by captured video data may be programmed to trigger an automatic change in playing mode, or to generate a message asking a user whether playing of video material 110 should switch from one mode to another.

According to numerous embodiments, a variety of criteria may be used to automatically determine potential playing-mode changes set to occur at certain points during the playing of video material 110. Such determinations may involve calculating positions within video material 110 at which a switch in playing mode may be desirable, and may also include finding playing modes that are compatible with the calculated positions. For example, a position may be found within video material 110 corresponding to a sudden alteration in dynamic characteristics of video material 110; in such an instance, it may be desirable to switch from an abridging mode, which presents an abridged version of video material 110, to an expanding mode that presents a longer and more detailed version of the segment of video material 110 showing altered dynamic characteristics. Conversely, detection of a more static phase within video material 110 may generate a signal to switch from an expanding mode, which presents a relatively longer and more detailed version of that phase, to an abridging mode, which presents a more abridged version of that phase of video material 110. In general, video playing module 25 may be implemented to facilitate modal switching initiated by both human users and by automated means.

The number of available playing modes may vary according to diverse embodiments of video playing module 25. In some cases, there may be only two available modes for playing video material 110, where one of the modes presents a more abbreviated version of video material 110 than the other mode does. The mode presenting the more abridged version of video material 110 may be designated as an abridging mode in relation to the other mode, which may be termed an expanding mode, relative to the abridging mode. According to some embodiments, both the abridging mode and the expanding mode may present abridged versions, or synoptic versions, or digested versions, of video material 110, such that neither the abridging mode nor the expanding mode offers a full and complete showing of video material 110. According to other embodiments, the expanding mode may present the full, complete, unabridged version of video material 110.

Some embodiments of video playing module 25 may offer more than two available modes for playing video material 110. There may be three, four, or more available playing modes, depending on the embodiments. Given any pair of available viewing modes provided by video playing module 25, one of the pair may present a more abbreviated version of video content 110 than the other of the pair of modes does. Thus, for a given pair of playing modes, one may be designated as an abridging mode, and the other as an expanding mode, with respect to each other.

According to various embodiments, video playing module 25 may enable switching from an abridging mode to an expanding mode, and from an expanding mode to an abridging mode, while video material 110 is playing. In this manner, video playing module 25 may allow for switching between a finer, more detailed and longer version of video content, and a coarser, less detailed and shorter version of the same video content. In a figurative sense, video playing module 25 may permit zooming in and zooming out of a stream of playing video material 110, not in the sense of physical magnification, but rather in the sense of viewing a more or a less abridged or condensed version of the same material 110. Video playing module 25 may permit a swifter traversal of a given segment of video material 110 when operating in an abridging mode than it does when operating in an expanding mode. In this manner, one may skim through less interesting parts of video material 110 in an abridging mode, but may slow down and examine more interesting or important parts of video material 110 in an expanding mode, which presents a more detailed, less condensed version of those interesting parts than the abridging mode does.

Various playing modes may play their own particular versions of video material 110. For example, a full presentation mode may present a full, complete, unabridged version of video material 110. On the other hand, another playing mode which does not present a full, complete, unabridged version of video material 110 may play a condensed version of video material 110. A condensed version of video material 110 may be obtained by various means, according to the embodiments. For example, in some instances, a condensed version of video material 110 may be constructed by assembling literal excerpts gotten from an original, full, complete, unabridged version of video material 110. In other instances, a condensed version of video material 110 may include material that is not a literal extract of the original, full and complete version of video material 110. For instance, a condensed version of video material 110 may be rendered as a synopsis or as a digest that is based upon the original, full, complete version of video material 110, but that is not a simple excerption. In various concrete renderings, a condensed version of video material 110 may be assembled or created manually by a human agent. In other renderings, a condensed version of video material 110 may be generated automatically. For example, a limited number of frames from the original, full and complete version of video material 110 may be extracted automatically at regular time intervals for assembly into a condensed rendering of video material 110. For another example, new video frames may be automatically generated by combining elements extracted from individual video frames of the original, full and complete version of video material 110, or by transforming content resident in the original, full and complete version of video material 110 to produce new video content. Any of a wide variety of algorithms or methods may be used to derive new video content from the original, full and complete recording of video material 110, and thus to generate a particular condensed version of video material 110. A particular playing mode may be invoked, either manually or automatically, according to various embodiments, to play a particular condensed version of video material 110. According to some embodiments, one condensed version of video material 110 may be derived from another condensed version of video material 110, without resorting to the original, full and complete version of video material 110.

Condensed versions of video material 110 may be generated in advance of the playing of such condensed versions, according to some embodiments. For instance, a publisher or purveyor or user of video material 110 may manufacture condensed versions of the original, full and complete version of video material 110, and may furnish the original, full and complete version of video material 110, along with the condensed versions, to video playing module 25.

In other embodiments, generation of condensed versions of the original, full and complete version of video material 110 may be dynamically performed by video playing module 25, in immediate response to a signal to play video material 110 in a particular viewing mode. Alternatively, video playing module 25 may generate a condensed version of video material 110 before receiving a request to play video material 110 in a mode corresponding to the condensed version. Video playing module 25 may derive a condensed version of the original, full and complete version of video material 110 either from another, preexisting condensed version of video material 110, or from the original, full and complete version of video material 110 itself. Video playing module 25 may generate such a condensed version in the same manner as a publisher or purveyor or user of video material 110 may generate a condensed version, using techniques provided by a publisher or purveyor or user of video material 110, according to some embodiments. According to other embodiments, video playing module 25 may generate a condensed version of video material 110 using techniques built in to video playing module 25 that do not depend on techniques used by a creator or user or purveyor of video material 110.

When video playing module 25 receives input to play video content in a particular viewing mode, video playing module 25 may select a version of video material 110 that matches the particular viewing mode. The selection may be determined by referring to a data structure listing viewing modes and various versions of video material 110 that match the various viewing modes.

If video playing module 25 receives input to switch from a current viewing mode for viewing video material 110 to another viewing mode for viewing video material 110, then in addition to selecting a condensed version of video material 110 that matches the other viewing mode, video playing module 25 may also determine a portion of video material 110 that is to be played in the other viewing mode, based on a location within the version of video material 110 that is presently playing in the current viewing mode.

For example, if video playing module 25 receives input to play video material 110 in an expanding mode that presents more detail than a currently-playing abridging mode does, then video playing module 25 may locate, within the abridging-mode version of video material 110, one or more frames which appeared on video display 100 approximately when the input to change modes was initiated, or it may determine some segment within the abridging-mode version of video material 110 that corresponds to the signal to switch viewing modes. Video playing mode 25 may then match the determined frames or segment of the abridging-mode version of video material 110 to a corresponding portion of the expanding-mode version of video material 110. The corresponding portion of the expanding-mode version of video material 110 may be matched using various criteria, according to the embodiments. For instance, video playing module may choose a simple superset of video frames that contain video frames which appeared on video display 100 approximately when the input to change modes was initiated. Such a superset may include some or all of the frames belonging to the expanding-mode version of video material 110, depending on requirements of the different embodiments. For another instance, video playing module 25 may determine the corresponding portion of the expanding-mode version of video material 110 by referring to a data structure that links locations within the abridging-mode version of video material 110 to matching subdivisions of the expanding-mode version of video material 110, and may begin playing a matching subdivision of the expanding-mode version of video material 110.

Various parameters may be set or invoked for matching a portion of the expanding-mode version of video material 110 with a given location within the abridging-mode version. For example, video playing module 25 may use a parameter specifying an amount of time allocated for playing a matching portion of the expanding-mode version of video material 110, and may tailor the matching portion so that it will play for the specified amount of time. Another parameter may designate a level within a multi-level classification for the expanding-mode version of video material 110. The designated level may specify a small, refined subdivision of the expanding-mode version of video material 110, or it may denote a larger, longer block containing several of the small, refined subdivisions. Still another parameter may specify that the matching portion of the expanding-mode version of video material 110 must play continuously from the beginning of the entire expanding-mode version of video material 110 to a point matching the given location within the abridging-mode version, or, alternatively, from a point in the expanding-mode version matching the given location within the abridging-mode version to the end of the entire expanding-mode version of video material 110. Video playing module 25 may refer to a variety of such controlling parameters, or to a configuration file, or to some other data structure in matching a portion of the expanding-mode version of video material 110 to a location within the abridging-mode version of video material 110.

In a similar fashion, when video playing module 25 receives input to play video material 110 in an abridging mode that presents a more concise representation of video material 110 than a currently-playing expanding mode does, then video playing module 25 may match a portion of the abridging-mode version of video material 110 to a location within the currently-playing expanding-mode version of video material 110, and then begin playing the matching abridging-mode version of video material 110.

By operating in the manner described in the foregoing paragraphs, video playing module 25 may permit fluid switching back and forth between viewing modes that offer varying levels of abridgment of video material 110. Switches between modes may be made at will, during continuous, uninterrupted playing of video material 110, according to numerous embodiments.

In some embodiments, in addition to providing the functions already described, video playing module 25 may also furnish a timeline interface displaying a representation of video material 110 comprising one or more video presentations. Video playing module 25 may implement any or all of the timeline features of the example embodiments illustrated in FIGS. 1A-1C, as well as other timeline features, as described below. According to some embodiments, one or more video presentations may be assembled, either manually or automatically, to collectively form video material 110. Video playing module 25 may depict the one or more video presentations in a visible representation. Timeline bar 120 shown in FIGS. 1A-1C provides an example of one kind of visible representation of video material 110.

Video playing module 25 may automatically play several video presentations represented on timeline interface 170 in a given sequential order. In some implementations, video playing module 25 may play represented video presentations completely through until all of them have been played, without changing viewing modes. In such embodiments, switching from one viewing mode to another viewing mode may require additional input to video playing module 25. Additional input to switch from one viewing mode to another may be provided a human user, in some instances. In other instances, input to switch viewing modes may be generated programmatically, without requiring user action. In certain cases, input to switch viewing modes may be embedded within video presentations themselves, or within configuration files governing the playing of the video presentations, as described above.

The manner in which video playing module 25 represents timeline bar 120 may vary according to numerous embodiments. For example, video playing module 25 may present discrete boxes, each corresponding to one of the video presentations, or to subdivisions of the video presentations. As another example, video playing module 25 may show several rows, each corresponding to a different viewing mode, and the several rows may be coordinated to reflect current playing states. If one of the rows represents a viewing mode that is currently in use, then it may be visibly distinguished from the other rows, while the rows' individual progress bars, like progress bar 130 of FIGS. 1A-1C, may be calibrated to move in synchronization as playing of video material 110 progresses. Video playing module 25 may also synchronize the several rows in other ways, such as by color coordination of discrete portions of timeline bars 120 which represent matching portions of video material 110, or by other kinds of integration. In general, video playing module 25 may implement a variety of representations of video material 110.

Video playing module 25 may also implement any or all of the other timeline features discussed for the embodiments illustrated in FIGS. 1A-1C. In particular, video playing module 25 may be configured to adjust the length of a part of timeline bar 120 representing a currently-playing component of video material 110 in case video playing module 25 receives input to switch from one viewing mode to another viewing mode. For example, if the received input indicates switching viewing modes in the abridging-to-expanding direction, then in the event that the portion of the expanding-mode version of video material 110 matching the currently-playing abridging-mode version of video material 110 is longer than the currently-playing abridging-mode version, then video playing module 25 may lengthen, enlarge, expand, or otherwise adjust a part of timeline bar 120 representing the currently-playing component of video material 110, and may correspondingly shorten, reduce, contract, or otherwise adjust parts of timeline bar 120 not representing the currently-playing component of video material 110. Such adjustments may occur in reverse if the viewing modes toggle in the expanding-to-abridging direction.

Other kinds of adjustment may be implemented, according to various embodiments. For example, upon receiving a command to switch from an abridging to an expanding mode, video playing module 25 may preserve a representation of video material 110 playing in the abridging mode, and additionally generate a separate representation of video material 110 playing in the expanding mode. After switching from the abridging to the expanding mode, video playing module 25 may correlate the two separate representations so that various timeline features are visibly matched or coordinated. For example, if some fraction of the abridging-mode version of video material 110 abridges a corresponding fraction of the expanding-mode version of video material 110, then their separate representations on timeline interface 170 may be colored to match. While playing proceeds in the expanding mode, dynamic changes to the separate expanding-mode representation of video material 110 may be reflected in the abridging-mode representation of video material 110. For instance, separate progress bars 130 may move synchronously as playing of video material 110 continues. Indications of transitions from one subdivision of video material 110 to another may also be synchronously displayed on the two separate representations.

Video playing module 25 may also be configured to display the total amount of time required to play video material 110 that is currently represented in the timeline representation of video presentations, but that has not yet been played, based on a current mode for playing the video material. As discussed previously, area 140 of timeline bar 120, depicted in FIGS. 1A-1C, may denote video content which is scheduled for playing, but which has not yet been played. As long as video playing module plays video material 110 in one viewing mode without switching to another viewing mode, progress bar 130 may grow and area 140 may shrink, because the proportion of video material 110 that has already played may keep growing, while the proportion of video material 110 which has not yet been played may continue to diminish. However, if video playing module 25 switches from a first playing mode to a second playing mode, then the replacement of a first-playing-mode version of video material 110 by a second-playing-mode version of video material 110 may alter the amount of time needed to finish playing video material 110 in the second playing mode. In response to such a substitution, video playing module 25 may display an updated total amount of time required to finish viewing unplayed video material 110 that is currently represented on timeline interface 170.

In addition to displaying the total time needed for viewing unplayed video material 110 shown in the current-playing-mode representation of video presentations, video playing module 25 may also indicate a fraction of video material 110 which cannot be viewed if the total time exceeds a maximum amount of time available for viewing. Such an indication may be based upon a maximum amount of available viewing time which has been preset, either by a human viewer, or by a configuration file, or by some other means for establishing a maximum amount of available viewing time. Video playing module 25 may use various means to indicate the fraction of video material 110 which cannot be viewed. For example, special coloring or highlighting may be applied to a part of timeline interface 170 which represents video material 110 which cannot be viewed in the current playing mode within the preset maximum amount of time available for viewing. For some embodiments, video playing module 25 may permit a human user or other agency to increase or decrease the maximum amount of time available for viewing, and may responsively update features of timeline interface 170 which depend on the preset maximum amount of time available for viewing.

Figure 3:
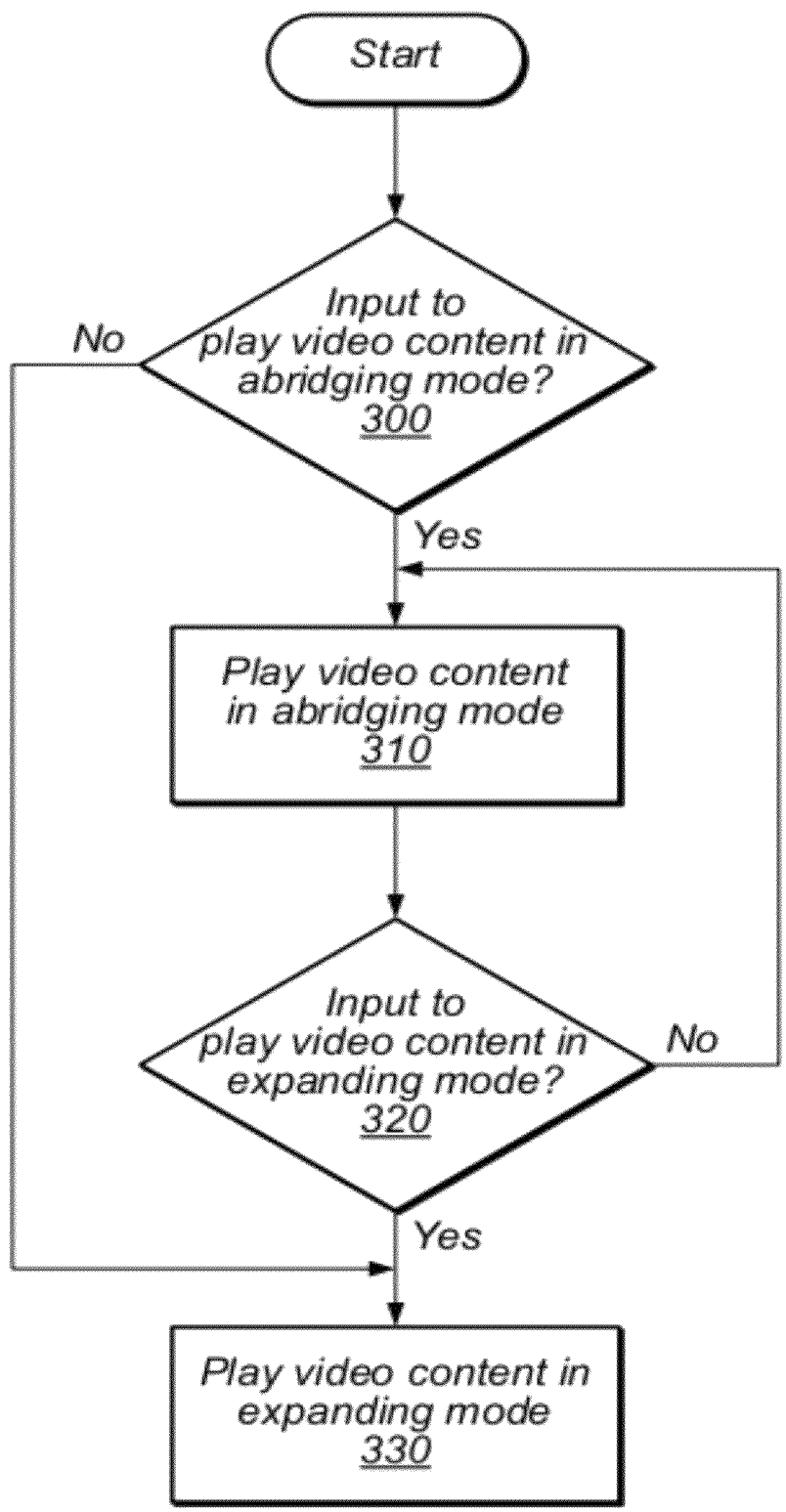
FIG. 3 is a flow diagram illustrating one embodiment of a method for playing video content in an abridging mode and in an expanding mode, and for switching between the two playing modes.

FIG. 3 is a flow diagram illustrating one embodiment of a method for playing video content in an abridging mode and in an expanding mode, and for switching between the two playing modes. Video playing module 25 may receive input to play video content 110 in an abridging mode, where the abridging mode presents an abridged version of video content 110 (300). In response, video playing module 25 may begin playing video content 110 in the abridging mode (310). While playing video content 110 in the abridging mode, video playing module 25 may receive input to switch from the abridging mode to an expanding mode, where the expanding mode presents a longer and more detailed version of video content 110 than the abridging mode does (320). In response, video playing module 25 may begin playing video content 110 in the expanding mode (330).

As described above, video playing module 25 may receive many different kinds of input signaling a switch from one viewing mode to another. In various embodiments, a user or a software entity or a hardware component may issue a signal to switch from one viewing mode to another viewing mode. In some embodiments, a user may generate switching input by activating a control element of an interface, like control element 160 in FIGS. 1A-1C. In some embodiments, a user may signal video playing module 25 to switch from one mode of playing to another mode of playing by touching video display 100, by touching a control button on a remote control device, by mouse or pointer manipulation, by pressing one or more keys of a keyboard, or by other suitable methods for generating input.

In still other embodiments, a signal for switching from one mode of playing video content 110 to another mode of playing video content 110 may be generated programmatically, without user intervention. For example, input to switch playing modes may be embedded within video content 110, or within configuration files governing the playing of video content 110. In some embodiments, cues recognizable by video playing module 25 may be embedded in video material 110 to trigger automatic switches from one playing mode to another playing mode. For another example, a configuration file that governs the manner in which video material 110 is played may inform video playing module 25 that it ought to switch from playing video material 110 in one mode to playing video material 110 in a different mode.

Figure 4A:
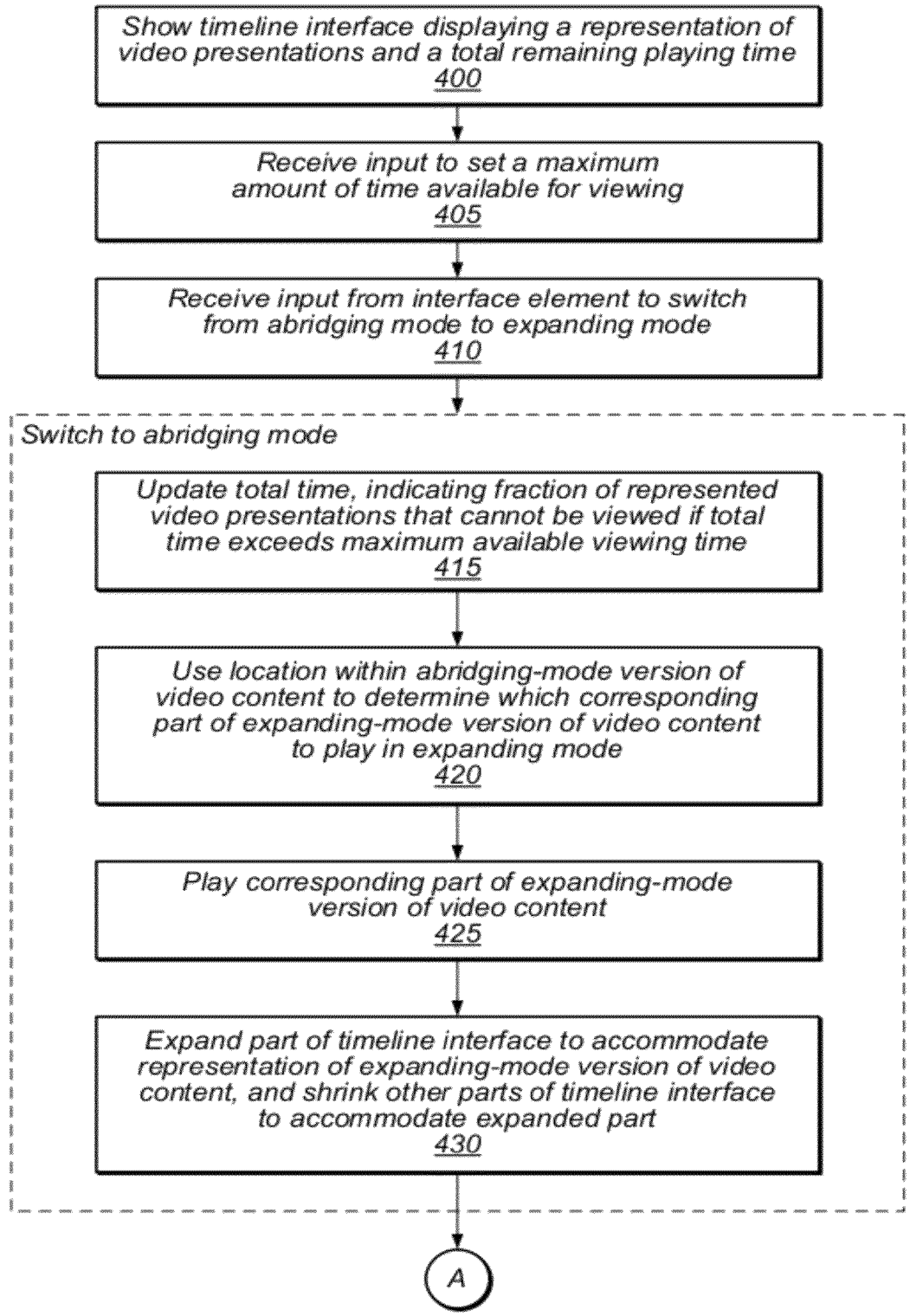
FIGS. 4A and 4B illustrate one embodiment of a usage flow for a multi-modal method for dynamically abridging and expanding video content while the video content is playing.
Figure 4B:
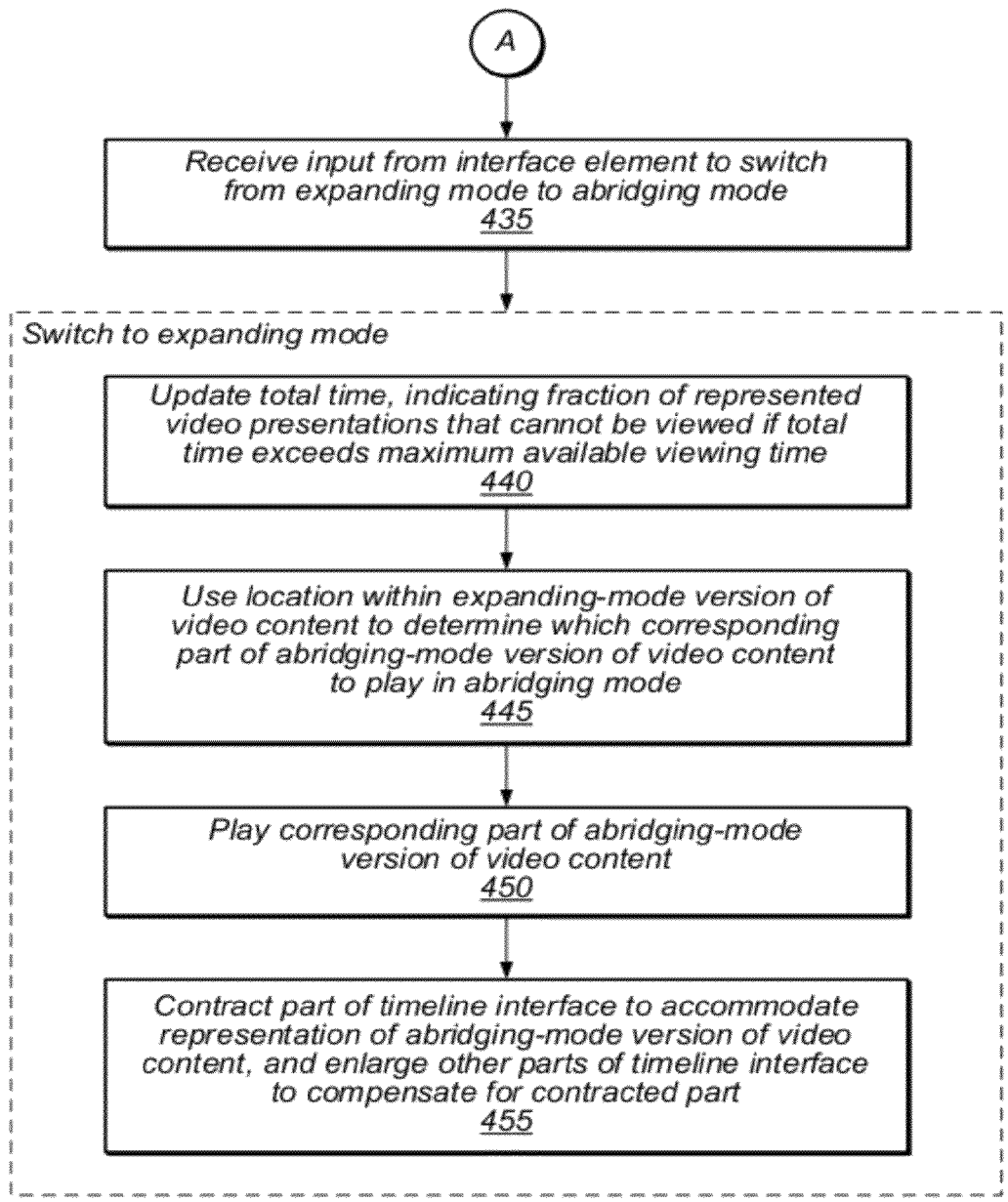

FIGS. 4A and 4B illustrate one embodiment of a usage flow for a multi-modal method for dynamically abridging and expanding video content while the video content is playing. Video playing module 25 may supply a timeline interface displaying a representation of video material 110 comprising one or more video presentations (FIG. 4A, 400). The video presentations may be assembled, manually or automatically, to collectively form video material 110. Timeline bar 120, shown in FIGS. 1A-1C, provides an example of one kind of visible representation of video material 110. Numerous diverse schemes may be implemented in video playing module 25 for representing video presentations that form video content 110. For example, video playing module 25 may present an array of discrete containers, each one representing one of the video presentations, or representing a subdivision of the video presentations. According to another scheme, video playing module 25 may show several rows or columns, where each one of the rows or columns corresponds to a viewing mode in which video content 110 may be played. In this scheme, the several rows or columns may display various elements and attributes for each playing-mode version of video content 110, in dynamic and synchronous response to the playing of video content 110 in the various modes. For example, the rows or columns may include individual progress bars, like progress bar 130 of FIGS. 1A-1C, which may be calibrated to move in synchronization as playing of video material 110 progresses. Video playing module 25 may also synchronize the several rows or columns in other ways, such as by color coordination of their discrete portions representing matching portions of video material 110, or by other types of integration and coordination. If one of the rows or columns represents the viewing mode that is currently in use, then it may be visibly distinguished from other rows or columns representing viewing modes that are not currently in use. According to numerous embodiments, video playing module 25 may implement a broad range of representations of video material 110.

Video playing module 25 may also be configured to display a total time required to play video content 110 that has not yet been played, based on a current mode for playing video content 110 (FIG. 4A, 400). According to some embodiments, video playing module 25 may devise a timeline interface that includes a representation of a fraction of video content 110 that has not yet been played. For embodiments like the ones illustrated in FIGS. 1A-1C, video playing module 25 may furnish area 140 to represent video content 110 which is scheduled for playing, but which has not yet been played. If video playing module 25 switches from a first playing mode to a second playing mode, then the replacement of a first-playing-mode version of video material 110 by a second-playing-mode version of video material 110 may alter the amount of time needed to finish playing video material 110 in the second playing mode. In response to such a substitution, video playing module 25 may display an updated total amount of time required to finish viewing unplayed video material 110 that is currently represented on timeline interface 170 (FIG. 4A, 415 & FIG. 4B, 440).

Elements of a timeline interface, such as a representation of individual video presentations included in video material 110, or a display of total remaining playing time, may be laid out to provide a user easy, immediate, and continually-updated orientation. The user may quickly and effortlessly discern a current playing position within the entirety of video content 110, and may also gather a more local sense of bearing for a currently-active viewing mode that may present a detailed version of video content 110, and that may break a presentation into subdivisions which are not perceptible when viewing video content 110 in a more condensed playing mode. The user may be continually apprised of how much time is left for viewing video content 110, receiving immediate notice when a change in viewing mode alters the length of time needed to view remaining video content 110.

Provision for setting a maximum amount of time available for viewing video content 110 may permit a human user or an automated mechanism to establish a maximum available viewing time, according to some implementations of video playing module 25 (FIG. 4A, 405). Some embodiments may permit resetting a preset maximum amount of time available for viewing video content 110. For example, if switching from one viewing mode to another viewing mode requires playing a shorter or a lengthier version of video material 110, then an operator may wish to change the setting for a maximum amount of time available for viewing video content 110. Accordingly, some embodiments of video playing module 25 may provide an operator with a mechanism for changing the maximum amount of time available for viewing video content 110. Such a change may be accomplished by using a variety of known methods of input. For example, video playing module 25 may display an interface control element that permits an operator to change the maximum amount of viewing time by typing in a value, or by selecting a value using mouse input.

For embodiments including a parameter that sets a maximum amount of time available for viewing video content 110, video playing module 25 may also indicate a fraction of video material 110 which cannot be viewed if the total time required to play remaining video content 110 exceeds a maximum amount of time available for viewing video content 110 (FIG. 4A, 415 & FIG. 4B, 440). Calculation of such a fraction may depend on the viewing mode in which video material 110 is currently playing, and may be reassessed if there is a switch from one viewing mode to another viewing mode. Conversely, if the total time required to play remaining video content 110 is less than a maximum preset amount of time available for viewing video content 110, then video playing module 25 may indicate spare time not required to finish viewing video content 110 in a current viewing mode. Various techniques may be used to indicated either a fraction of video material 110 which cannot be viewed in a given span of time, or excess time that may be available after viewing of video material 110 in a current mode has finished. For instance, special coloring or highlighting may be applied to a part of timeline interface 170 representing video material 110 which cannot be viewed in the current playing mode within the preset maximum amount of time available for viewing. Coloring may also extend along timeline interface 170 past the representation of video content 110 in order to show a graphical measure of excess time that may be available after viewing of video material 110 in a current mode has been completed.

On the basis of such time indications, an operator or other agency may wish to modify the assemblage of video material 110 scheduled for playing in a current playing mode. For example, a determination may be made to delete or to add video content scheduled for playing by video playing module 25. Alternatively, an operator or an automated agent may decide to switch from one viewing mode to another viewing mode in order to lengthen or shorten the total time required to play remaining video content 110.

Video playing module 25 may provide assorted mechanisms for receiving input to switch from one viewing mode to another viewing mode (FIG. 4A, 410 & FIG. 4B, 435). For example, as explained in the previous description of FIGS. 1A-1C, an interactive interface element 160 may function as a viewing-mode selector. Alternatively, an operator may press a combination of keys on a keyboard, or may press a physical button implemented in hardware to signal a desire to switch between or among two or more playing modes for video content 110. As discussed above, a mechanism for dynamically and fluidly switching among several viewing modes offering varying levels of abridgment of video material 110 while playing video material 110 may greatly ease and accelerate the process of sifting through a series of video episodes, or even one long video production, in order to locate compelling or sought-after portions.

When switching from a former viewing mode to a latter viewing mode, video playing module 25 may select a version of video material 110 that is compatible with the latter viewing mode. In addition, video playing module 25 may also determine a certain portion of video material 110 that should be played in the latter viewing mode, based on a location within the version of video material 110 playing in the former viewing mode (FIG. 4A, 420 & FIG. 4B, 445). The previous narration regarding video playing module 25 presents several different methods for determining which portion of video material 110 should be played in a latter viewing mode, and according to numerous embodiments, video playing module 25 may match portions of one modal version of video material 110 with another modal version of video material 110 in numerous ways. Single embodiments of video playing module 25 may also implement several different methods for associating portions of two different viewing-mode versions of video material 110, where the portions may range in size from few to many video frames. When it receives a signal to switch from one viewing mode A to another viewing mode B, then video playing module 25 may choose a particular method of associating mode-A versions of video material 110 with mode-B versions, and based upon a location within the mode-A version of video content 110, may determine what portion of video content 110 should be played in mode B. Such determination may be guided by one or more parameters, as indicated in the earlier description of video playing module 25.

After determining what portion of video content 110 should be played in a selected viewing mode, video playing module 25 may then play the determined portion of video content in the selected viewing mode (FIG. 4A, 425 & FIG. 4B, 450). In switching from viewing mode A to viewing mode B, video playing module 25 may expand or contract a part of the timeline interface in order to accommodate a representation of a portion of video content 110 scheduled to play in viewing mode B. Other parts of the timeline may be correspondingly shrunk or enlarged to compensate for the expansion or contraction of part of the timeline interface (FIG. 4A, 430 & FIG. 4B, 455).

Exemplary Computer System

It is contemplated that in some embodiments, any of the methods, techniques or components described above may be implemented as instructions and data capable of being stored or conveyed via a computer-accessible medium. Such methods or techniques may include, for example and without limitation, the various methods for dynamically switching between viewing video material in an abridging mode and viewing in an expanding mode, as described above with respect to FIGS. 1-4. In particular, video playing module 25 or any partition of its functions may be implemented as such instructions. Such instructions may be executed to perform a particular computational function, such as generating, sending, or receiving a message, to implement mathematical functions such as integration, differentiation, convolution, etc., as well as to implement higher-order functions such as operating system functioning, network communications functioning, application functioning, and/or any other suitable functions.

Figure 5:
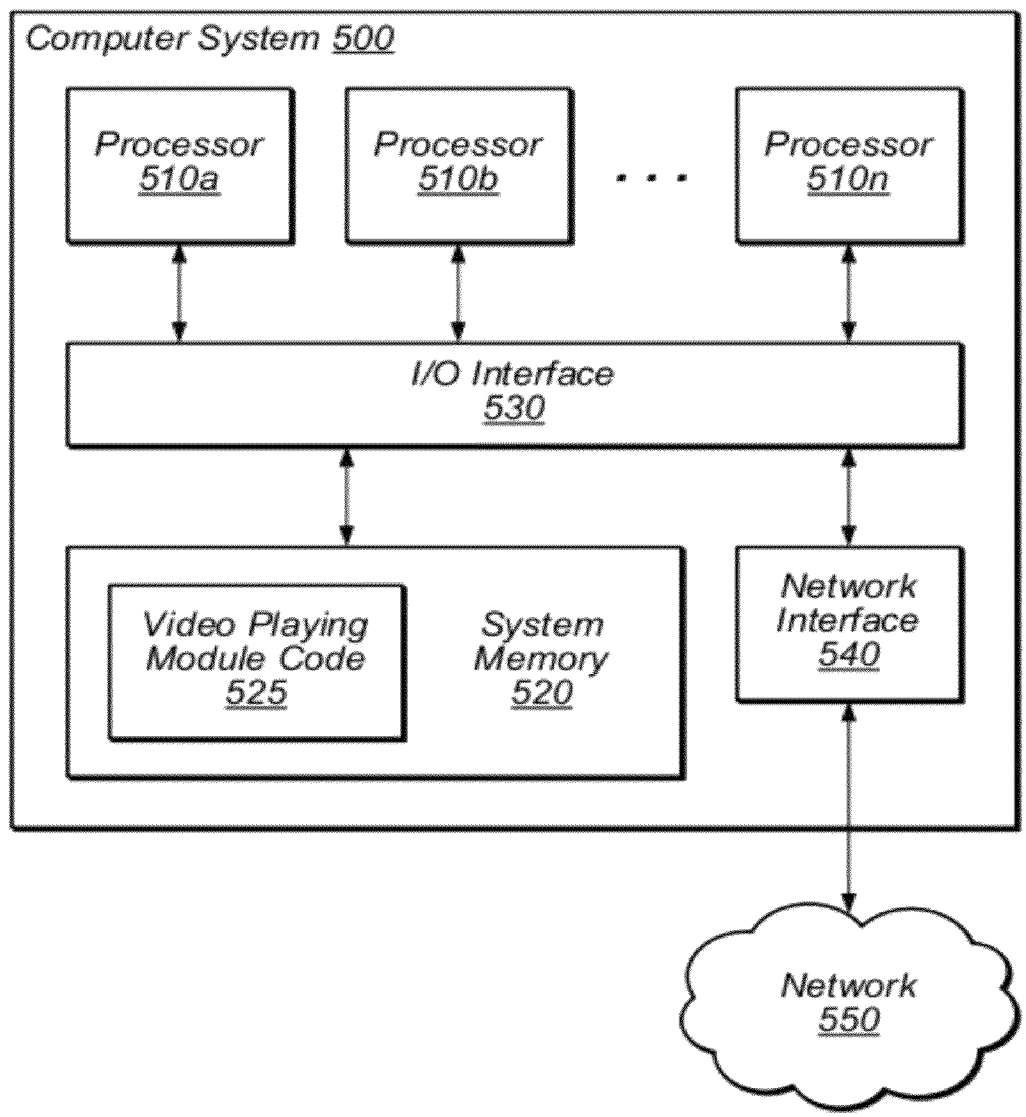
FIG. 5 is a block diagram illustrating an embodiment of a computer system.

One exemplary embodiment of a computer system including tangible, computer-accessible storage media is illustrated in FIG. 5. In the illustrated embodiment, computer system 500 includes one or more processors 510 coupled to a system memory 520 via an input/output (I/O) interface 530. Computer system 500 further includes a network interface 540 coupled to I/O interface 530. In different embodiments, system 500 may be variously configured as a desktop computer system, a laptop or notebook or netbook computer, a mainframe computer system, a workstation, a network computer, a handheld computing device such as a personal digital assistant, cellular phone, media player, or combination device, a camera, a set top box, a mobile device, a consumer device, a video game console, a handheld video game device, an application server, a storage device, a peripheral device such as a switch, modem, or router, or another type of computing or electronic device. In various embodiments, computer system 500 may be representative of computer system 20 of FIG. 2.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 510 may commonly, but not necessarily, implement the same ISA.

System memory 520 may be configured to store instructions and data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 520 as video playing module code 525. It is noted that in some embodiments, video playing module code 525 may include instructions and data implementing desired functions that are not directly executable by processor 510 but are represented or encoded in an abstract form that is translatable to instructions that are directly executable by processor 510. For example, video playing module code 525 may include instructions specified in an ISA that may be emulated by processor 510, or by other code executable on processor 510. Alternatively, video playing module code 525 may include instructions, procedures or statements implemented in an abstract programming language that may be compiled or interpreted in the course of execution. As non-limiting examples, video playing module code 525 may include code specified in a procedural or object-oriented programming language such as C or C++, a scripting language such as Perl or Ruby or Python, a markup language such as HTML or XML, or any other suitable language.

In one embodiment, I/O interface 530 may be configured to coordinate I/O traffic between processor 510, system memory 520, and any peripheral devices in the device, including network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functioning of I/O interface 530, such as an interface to system memory 520, may be incorporated directly into processor 510.

Network interface 540 may be configured to allow data to be exchanged between computer system 500 and other devices attached to a network 550, such as other computer systems or communications devices, for example. In particular, network interface 540 may be configured to allow communication between computer system 500 and various external devices. These external devices may include various computing and communications devices, which may include elements similar to those of computer system 500. In particular, the external devices may include personal computers, telephony devices or network-attached computing devices that users may employ to access network services. Network interface 540 may commonly support one or more wireless networking protocols (e.g., Wi-Fi/IEEE 802.11, or another wireless networking standard). However, in various embodiments, network interface 540 may support communication via any suitable wired or wireless general data networks, such as other types of Ethernet network, for example. Additionally, network interface 540 may support communication via telecommunications/telephony networks such as analog voice networks or digital fiber communications networks, via storage area networks such as Fibre Channel SANs, or via any other suitable type of network and/or protocol.

In some embodiments, system memory 520 may be one embodiment of a tangible, computer-accessible storage medium configured to store instructions and data as described above. However, in other embodiments, instructions and/or data may be stored upon and retrieved from different types of computer-accessible storage media. Generally speaking, a computer-accessible medium may include storage media or memory media such as magnetic or optical media, e.g., disk or CD/DVD-ROM coupled to computer system 500 via I/O interface 530. A computer-accessible medium may also include any volatile or non-volatile media such as RAM (e.g. SDRAM, DDR SDRAM, RDRAM, SRAM, etc.), ROM, etc, that may be included in some embodiments of computer system 500 as system memory 520 or another type of memory. A computer-accessible medium may generally be accessible via transmission media or signals such as electrical, electromagnetic, or digital signals, which may be conveyed via a communication medium such as a network and/or a wireless link, such as may be accessed via network interface 540.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A method, comprising:
   receiving input to play video content in an abridging mode, wherein the abridging mode presents an abridged version of the video content, and in response, playing the video content in the abridging mode; and
   while playing the video content in the abridging mode, receiving input to switch from the abridging mode to an expanding mode, wherein the expanding mode presents a longer and more detailed version of the video content than the abridging mode does, and in response, playing the video content in the expanding mode;
   wherein both the input to play video content in an abridging mode, and the input to switch from the abridging mode to an expanding mode, are generated via an interactive control element of a displayed interactive timeline interface;
   wherein the timeline interface, during the playing of the video content, dynamically performs:
     synchronously displaying one or more elements of the timeline interface which visibly represent the video content and which are visibly synchronized with the playing of the video content;
     receiving input to the interactive control element to change the playing of the video content from one level of abridgement to another level of abridgement; and
     adjusting one or more portions of the timeline interface to visibly and dynamically reflect the playing of the video content at a changed level of abridgement.

2. The method of claim 1, further comprising, in response to receiving the input to switch from the abridging mode to the expanding mode, determining a corresponding portion of the video content to be played in the expanding mode based on a location within the video content currently playing in the abridging mode.

3. The method of claim 1, further comprising, while playing the video content in the expanding mode, receiving input to switch to the abridging mode, and in response, playing the video content in the abridging mode.

4. The method of claim 1, further comprising providing at least three different modes for playing the video content, wherein for each pair of the at least three different modes, one of the pair of modes presents a more abbreviated version of the video content than the other of the pair of modes does, and wherein the abridging mode and the expanding mode are two of the at least three different modes.

5. The method of claim 1, wherein the expanding mode is a full presentation mode that presents a complete version of the video content.

6. The method of claim 1, further comprising providing an indicator showing a mode in which the video content is currently playing.

7. The method of claim 1, wherein the video content is one of a plurality of video presentations, and further comprising providing an indication when playing transitions from one of the plurality of video presentations to another of the plurality of video presentations.

8. The method of claim 7, wherein the timeline interface displays representations of the plurality of video presentations, and wherein at least one of the one or more portions of the timeline interface expands in response to switching from the abridging mode to the expanding mode while playing the video content, and contracts in response to switching from the expanding mode to the abridging mode while playing the video content.

9. The method of claim 8, further comprising:
displaying a total time required to play video material that is currently represented in the representations of the plurality of video presentations and that has not yet been played, based on a current mode for playing the video material; and
updating the total time in response to switching from the current mode for playing to another mode for playing.

10. The method of claim 9, further comprising indicating a portion of the video material which cannot be viewed if the total time exceeds a maximum amount of time available for viewing.

11. A system, comprising:
a processor; and
a memory coupled to the processor, wherein the memory stores program instructions executable by the processor to implement a video playing module configured to perform:
receiving input to play video content in an abridging mode, wherein the abridging mode presents an abridged version of the video content, and in response, playing the video content in the abridging mode; and
while playing the video content in the abridging mode, receiving input to switch from the abridging mode to an expanding mode, wherein the expanding mode presents a longer and more detailed version of the video content than the abridging mode does, and in response, playing the video content in the expanding mode;
wherein both the input to play video content in an abridging mode, and the input to switch from the abridging mode to an expanding mode, are generated via an interactive control element of a displayed interactive timeline interface, wherein the timeline interface is configured to, during the playing of the video content, dynamically:
synchronously display one or more elements of the timeline interface which visibly represent the video content and which are visibly synchronized with the playing of the video content;
receive input to the interactive control element to change the playing of the video content from one level of abridgement to another level of abridgement; and
adjust one or more portions of the timeline interface to visibly and dynamically reflect the playing of the video content at a changed level of abridgement.

12. The system of claim 11, wherein the video playing module is further configured to perform, in response to receiving the input to switch from the abridging mode to the expanding mode, determining a corresponding portion of the video content to be played in the expanding mode based on a location within the video content currently playing in the abridging mode.

13. The system of claim 11, wherein the video playing module is further configured to perform, while playing the video content in the expanding mode, receiving input to switch to the abridging mode, and in response, playing the video content in the abridging mode.

14. The system of claim 11, wherein the video playing module is further configured to perform providing at least three different modes for playing the video content, wherein for each pair of the at least three different modes, one of the pair of modes presents a more abbreviated version of the video content than the other of the pair of modes does, and wherein the abridging mode and the expanding mode are two of the at least three different modes.

15. The system of claim 11, wherein the expanding mode is a full presentation mode that presents a complete version of the video content.

16. The system of claim 11, wherein the video content is one of a plurality of video presentations, and wherein the video playing module is further configured to perform providing an indication when playing transitions from one of the plurality video presentations to another of the plurality of video presentations.

17. The system of claim 16, wherein the timeline interface displays representations of the plurality of video presentations, and wherein at least one of the one or more portions of the timeline interface expands in response to switching from the abridging mode to the expanding mode while playing the video content, and contracts in response to switching from the expanding mode to the abridging mode while playing the video content.

18. A non-transitory computer-readable storage medium storing program instructions, wherein the program instructions are computer-executable to perform:
receiving input to play video content in an abridging mode, wherein the abridging mode presents an abridged version of the video content, and in response, playing the video content in the abridging mode; and
while playing the video content in the abridging mode, receiving input to switch from the abridging mode to an expanding mode, wherein the expanding mode presents a longer and more detailed version of the video content than the abridging mode does, and in response, playing the video content in the expanding mode;
wherein both the input to play video content in an abridging mode, and the input to switch from the abridging mode to an expanding mode, are generated via an interactive control element of a displayed interactive timeline interface, wherein the timeline interface is configured to, during the playing of the video content, dynamically:
synchronously display one or more elements of the timeline interface which visibly represent the video content and which are visibly synchronized with the playing of the video content;
receive input to the interactive control element to change the playing of the video content from one level of abridgement to another level of abridgement; and
adjust one or more portions of the timeline interface to visibly and dynamically reflect the playing of the video content at a changed level of abridgement.

19. The computer-readable storage medium of claim 18, wherein the program instructions are computer-executable to further perform:
providing an indicator showing a mode in which the video content is currently playing; and
while playing the video content in the expanding mode, receiving input to switch to the abridging mode, and in response, playing the video content in the abridging mode.

20. The method of claim 1, further comprising:

automatically switching the playing of the video content from one video playing mode to another video playing mode, wherein said automatic switching:

is in an abridging-to-expanding direction or in an expanding-to-abridging direction; and is performed based on criteria for determining potential video playing mode switches, wherein the criteria include one or more of:

- an alteration in dynamic characteristics of playable video material of the video content;
- a limitation on the time available for viewing a remaining portion of the video content;
- a configuration file governing the manner in which the video content is played;
- cues embedded in the video content; or
- a programmatic indication to perform said automatic switching.

* * * * *